United States Patent [19]

Godard

[11] 4,253,186
[45] Feb. 24, 1981

[54] METHOD AND DEVICE FOR DETECTING A PSEUDO-RANDOM SEQUENCE OF TWO SYMBOLS IN A DATA RECEIVER EMPLOYING DOUBLE SIDEBAND-QUADRATURE CARRIER MODULATION

[75] Inventor: Dominique N. Godard, Le Rouret, France

[73] Assignee: International Business Machines Corporation, Armonk, N.Y.

[21] Appl. No.: 102,298

[22] Filed: Dec. 10, 1979

[30] Foreign Application Priority Data

Dec. 20, 1978 [FR] France ............................ 78 36581

[51] Int. Cl.³ ...................... H04L 5/12; H04L 23/02
[52] U.S. Cl. ...................................... 375/77; 370/20; 375/39; 375/43; 375/50; 375/15
[58] Field of Search .................... 370/12, 20; 328/72, 328/74, 109, 155; 358/195; 364/485, 575; 375/39, 43, 50, 77, 86; 455/46, 202

[56] References Cited

U.S. PATENT DOCUMENTS

| | | | |
|---|---|---|---|
| 3,378,770 | 4/1968 | Daguet | 375/43 |
| 3,443,229 | 5/1969 | Becker | 370/20 |
| 3,518,680 | 6/1970 | McAuliffe | 370/20 |
| 4,100,376 | 7/1978 | Woythaler | 370/20 |

*Primary Examiner*—Benedict V. Safourek
*Attorney, Agent, or Firm*—John B. Frisone

[57] ABSTRACT

A method and a device which, in a receiver forming part of a data transmission system using DSB-QC modulation, permit detecting the beginning of a pseudo-random sequence of symbols pertaining to a first set of two symbols when this sequence is preceded by a sequence of successive alternations between two symbols pertaining to a second set, with the first and second sets being such that the beginning of said pseudo-random sequence will initiate a reversal of the phase of the components of the frequency spectrum of said sequence of alternations. In accordance with the method of the present invention, the received signal is demodulated, the DC component of the demodulated signal is determined, and the energy of that DC component is measured. The time at which said energy drops below its average value is indicative of the beginning of the pseudo-random sequence. In accordance with one aspect of the invention, the DC component of the demodulated signal is determined by passing the signal through a lowpass filter.

7 Claims, 4 Drawing Figures

METHOD AND DEVICE FOR DETECTING A PSEUDO-RANDOM SEQUENCE OF TWO SYMBOLS IN A DATA RECEIVER EMPLOYING DOUBLE SIDEBAND-QUADRATURE CARRIER MODULATION

DESCRIPTION

1. Technical Field

This invention relates to specific sequence detectors used in the receivers of data transmission systems employing double sideband-quadrature carrier (DSB-QC) modulation. More particularly, the invention relates to a method and a device for detecting the time at which the beginning of a pseudo-random sequence of symbols pertaining to a first set of two symbols is received when this sequence is preceded by a sequence of successive alternations between two symbols pertaining to a second set, said first and second sets being such that the beginning of the pseudo-random sequence will initiate a phase reversal of the components of the frequency spectrum of the sequence of alternations.

The invention is especially useful for detecting the equalizer training sequence prescribed by CCITT Recommendation V29.

The term DSB-QC modulation refers to a class of modulation techniques that includes phase shift keying, amplitude phase shift keying and quadrature amplitude modulation.

2. Background Art

In those data transmission systems which use DSB-QC modulation, the sequence of bits to be transmitted is first divided into groups of Q bits and each of these groups is made to correspond to one of $2^Q$ complex numbers, or complex symbols. These symbols are then transmitted one at a time at instants which have a regular T-second spacing and are called signaling instants. Each symbol is transmitted by causing a given amplitude value of each of two quadrature carrier waves to correspond, respectively, to its real and imaginary parts. The two carriers are then combined and applied to the input of the transmission channel.

The function of the transmission channel is to provide at its output, connected to a data receiver, a signal as similar as possible to the input signal applied thereto. Mainly due to cost considerations, telephone lines are frequently used as transmission channels. However, such lines, while satisfactory for voice transmission purposes, become inadequate when used to transmit digital data at speeds equal to or higher than 4800 bits per second (bps) with a very low probability of error. Telephone lines cause impairments which affect the quality of the signals being transmitted and make it difficult to correctly detect the transmitted data. These impairments mainly include amplitude and phase distortions that create an interaction between successive signals. This interaction is known as intersymbol interference. In high speed data transmission systems, the receiver is generally provided with an automatic adaptive equalizer to minimize the effects of the intersymbol interference before detection of the data begins.

The type of adaptive equalizer that is the most widely used in those data transmission systems which employ DSB-QC modulation is the complex transversal equalizer, an exemplary embodiment of which is described in U.S. Pat. No. 3,947,768. In such an equalizer, each of the in-phase and quadrature components of the received signal is applied to the inputs of a pair of transversal filters whose outputs are then combined to generate the in-phase and quadrature components of the equalized signal. The coefficients of these filters, which are the coefficients of the equalizer, are automatically adjusted to meet a given performance criterion. Prior to the transmission of data, it is necessary that the values of the coefficients be as close as possible to optimum values. To this end, provision is made for a training period during which, before transmitting any data, a known training sequence is transmitted to the receiver, which compares same with an identical, locally generated training sequence to obtain an error signal enabling the coefficients of the equalizer to be initially adjusted to values that are as close as possible to said optimum values. The coefficients are then continuously adjusted during transmission of the data.

In a receiver, the carrier detector, the AGC circuit, the clock recovery device and, lastly, the equalizer must all be properly conditioned before the transmission of data begins. Accordingly, provision has been made for a so-called turn-on period during which, before transmitting any data, a turn-on sequence is generated by the transmitter to condition all of the devices contained in the receiver. This turn-on sequence generally comprises a synchronizing sequence for properly conditioning the carrier detector, the AGC circuit and the clock recovery device, this being followed by an equalizer training sequence. It will thus be seen that a training sequence detector must be provided in the receiver to permit detecting the beginning of the training sequence and initiating the equalizer training process.

In its Recommendation V29 relating to the standardization of 9600 bps modems, the "Comite Consultatif International Telegraphique at Telephonique" (CCITT) prescribed the use of a turn-on sequence comprising a synchronizing sequence consisting of successive alternations between two predetermined symbols, followed by an equalizer training sequence which is a pseudo-random sequence of symbols belonging to a set of two other predetermined symbols. French Patent Application No. 77-15295 (publication No. 2,352,456) describes two methods of detecting the synchronizing and training sequences and the transitions from the former to the latter where the synchronizing sequence exhibits a frequency spectrum comprising a line at the carrier frequency and two lines that are symmetrical about the first, and where the training sequence has a spectrum distributed all over the frequency band used for the transmission of data. These spectra are in accordance with those prescribed by CCITT Recommendation V29 for the synchronizing and training sequences.

The first method described in said patent application involves the use of a bandpass filter such that the energy level at the output thereof is very low during the synchronizing sequence and increases significantly from the beginning of the training sequence. Thus, it may be possible, by measuring the energy level at the output of the filter, to detect the various sequences and the transitions from a sequence to another. As stated in the aforementioned patent application, one of the disadvantages of the above method is that the bandpass filter may damp the transients that occur when passing from a sequence to another and thus provide spurious indications.

The second method described in the above-mentioned patent application No. 77-15295 requires the use of a filter for extracting from the received signal the component thereof at the carrier frequency, and a device serving to detect the zero crossings of that component. By measuring the time intervals between the zero crossings, one may detect the sequences and the transitions from a sequence to another.

OBJECT AND SUMMARY OF THE INVENTION

The principal object of the present invention is to provide, in a data receiver using DSB-QC modulation, a method and a device for detecting a random sequence of symbols pertaining to a first set of two predetermined symbols when this sequence is preceded by a sequence of successive alternations between two symbols pertaining to a second set, which are both accurate and insensitive to noise.

It is another object of the invention to provide a method and a device for detecting the equalizer training sequence prescribed by CCITT Recommendation V29.

These and other objects are generally attained in accordance with the present invention through the use of a method and a device which, in a receiver forming part of a data transmission system using DSB-QC modulation, permit detecting the beginning of a pseudo-random sequence of symbols pertaining to a first set of two symbols when this sequence is preceded by a sequence of successive alternations between two symbols pertaining to a second set, with the first and second sets being such that the beginning of said pseudo-random sequence will initiate a reversal of the phase of the components of the frequency spectrum of said sequence of alternations. In accordance with the method of the present invention, the received signal is demodulated, the DC component of the demodulated signal is determined, and the energy of that DC component is measured. The time at which said energy drops below its average value is indicative of the beginning of the pseudo-random sequence. In accordance with one aspect of the invention, the DC component of the demodulated signal is determined by passing the signal through a low-pass filter.

The invention also proposes a device for implementing the present method. According to a preferred embodiment of the invention, the low-pass filters are realized by making use of the complex equalizer provided in the receiver.

The foregoing and other objects, features and advantages of the invention will be apparent from the following more particular description of a preferred embodiment of the invention, as illustrated in the accompanying drawings.

DETAILED DESCRIPTION OF THE INVENTION

Generally, this invention relates to a method and a device for detecting the beginning of a sequence of symbols pseudo-random pertaining to a first set of two symbols when it is preceded by a sequence of successive alternations between two symbols pertaining to a second set, with said first and second sets being such that the beginning of said pseudo-random sequence will initiate a reversal of the phase of the components of the spectrum of said sequence of alternations. For clarity, and without in any way intending to limit the scope of the invention, a description will be given below of the manner in which the invention can be used to detect the equalizer training sequence prescribed by CCITT Recommendation V29.

Figure 1:
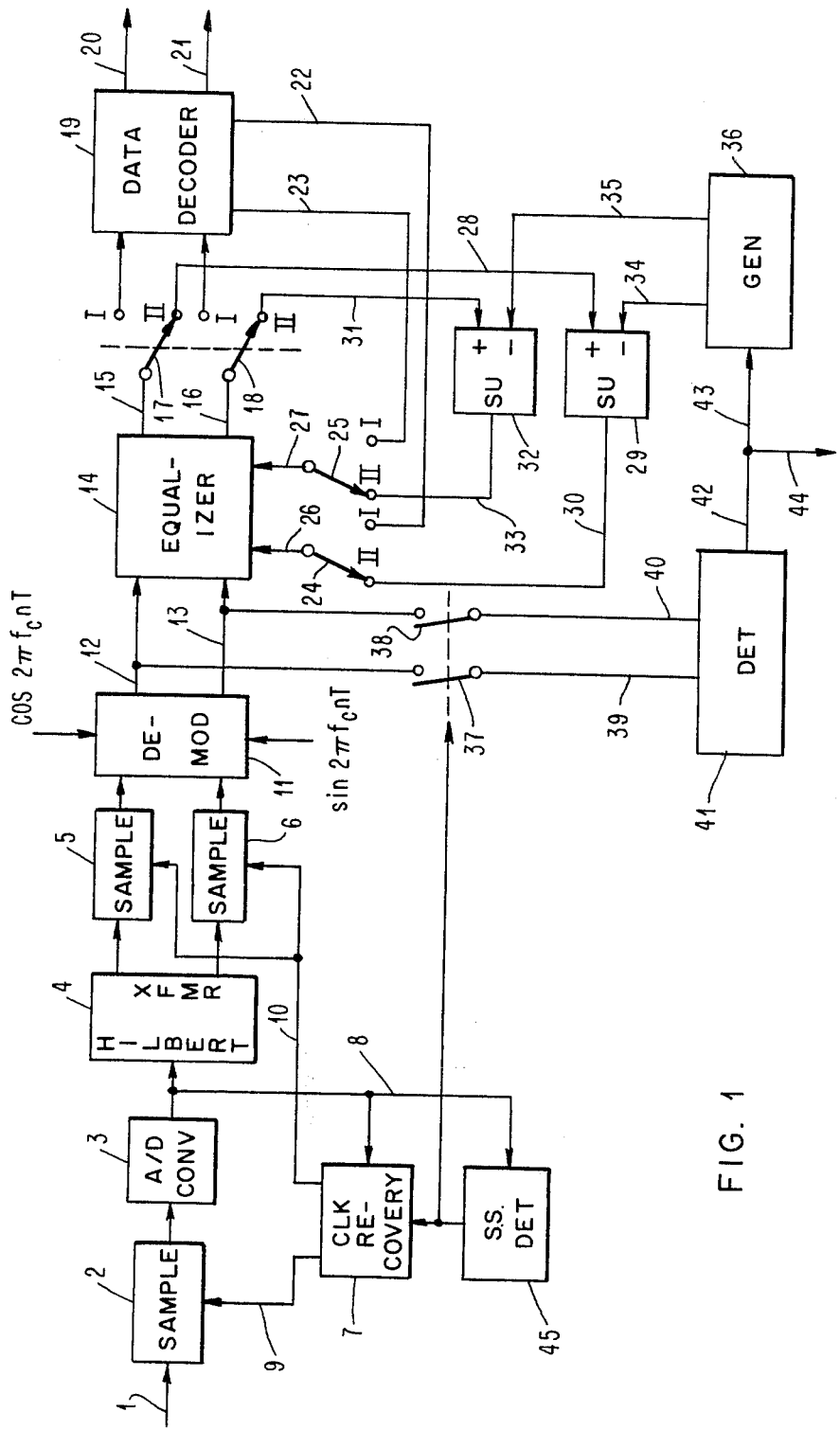
FIG. 1 is a block diagram of a DSB-QC receiver incorporating the present invention.

To illustrate the context within which the invention finds application, a typical block diagram of a DSB-QC, 9600 bps receiver in accordance with CCITT Recommendation V29 and incorporating the sequence detector of the invention has been shown in FIG. 1. The signal received from the transmission channel and the energy of which has been normalized by an automatic gain control circuit (not shown), is applied via a line 1, after being passed through a bandpass filter (not shown) which rejects the out-of-band noise, to a sampling device 2 in which it is sampled at the rate $1/\tau$. The selected rate $1/\tau$ is equal to a multiple $m/T$ of the signaling rate $1/T$ so as to provide a sufficient number of samples at the output of the device 2 to enable the received signal to be properly defined. The value of the amplitude of these samples is converted to digital form in an analog-to-digital converter 3 and inputted to a digital Hilbert transformer 4. A Hilbert transformer is a two-output device which supplies the in-phase and quadrature components of an input signal applied thereto. An exemplary digital embodiment of such a device is described in an article entitled, "Theory and Implementation of the Discrete Hilbert Transform," by L. R. Robiner and C. M. Rader, in *Digital Signal Processing*, IEEE Press, 1972.

The in-phase and quadrature components of the input signal applied to the Hilbert transformer 4 are respectively resampled at the signaling rate $1/T$ by two sampling devices 5 and 6. A clock recovery device 7 has its input connected via a line 8 to the output of the analog-to-digital converter 3 and controls the sampling device 2 via a line 9, the sampling devices 5 and 6 via a line 10, and all other components of the receiver via lines not shown. An exemplary embodiment of such a clock recovery device is described in U.S. Pat. No. 4,039,748.

The in-phase and quadrature components, respectively provided at the outputs of the sampling devices 5 and 6, of the received signal are applied to the inputs of a complex demodulator 11. The demodulator 11 receives from a local source (not shown) an in-phase carrier of the form $\cos 2\pi f_c nT$ and a quadrature carrier of the form $\sin 2\pi f_c nT$, where $f_c$ is the carrier frequency and $n$ is a positive integer between zero and infinity. If the signal received at the signaling instant $nT$ is designated $r_n$, the in-phase and quadrature components thereof respectively available at the outputs of sampling devices 5 and 6 may be expressed as $r_{i,n}$ and $r_{q,n}$, respectively. The demodulator 11 provides on the lines 12 and 13 the in-phase and quadrature components $y_{i,n}$ and $y_{q,n}$, respectively, of the demodulated signal $y_n$, in accordance with the well-known relations:

$$y_{i,n} = r_{i,n} \cos \omega_c t + r_{q,n} \sin \omega_c t \tag{1}$$

$$y_{q,n} = -r_{i,n} \sin \omega_c t + r_{q,n} \cos \omega_c t \tag{2}$$

The in-phase and quadrature components available on the line 12 and 13 are applied to the inputs of an adaptive complex transversal equalizer 14, an exemplary embodiment of which is described in French patent No. 73-26404 filed by the present applicant July 12, 1973 (publication No. 2,237,379).

The in-phase and quadrature components of the equalized signal are respectively applied via lines 15 and 16 to the common input of a pair of two-position switches 17 and 18. Positions I of these switches are connected to the inputs of a data detection system 19 which provides on its output lines 20 and 21 the in-phase and quadrature components, respectively, of the detected data symbols. The system 19 also supplies on its output lines 22 and 23 the in-phase and quadrature components of an error signal representative of the difference between the components of the equalized signal and those of the detected data symbol corresponding thereto. An exemplary embodiment of a data detection system is described in U.S. Pat. No. 4,024,342. Lines 22 and 23 are respectively connected to positions I of a pair of two-position switches 24 and 25 whose outputs are respectively connected to the equalizer 14 via lines 26 and 27. Position II of the switch 17 is connected via a line 28 to the (+) input of a subtractor 29 which has its output connected to position II of the switch 24 via a line 30. Position II of the switch 18 is connected via a line 31 to the (+) input of a subtractor 32 which has its output connected to position II of the switch 25 via a line 33. The (−) inputs of the subtractors 29 and 32 are connected via lines 34 and 35, respectively, to the output of a generator 36 of reference training sequences. This generator will be described in detail with reference to FIG. 4.

The lines 12 and 13 are also connected through a pair of switches 37 and 38 to two lines 39 and 40, respectively, both of which lines are connected to the inputs of a training sequence detector 41. The detector 41 is a sequence detector in accordance with the invention and will be described in detail with reference to FIG. 2. The output 42 of the detector 41 is connected to the generator 36 via a line 43, and to the switches 17, 18, 24 and 25 via a line 44.

A synchronizing sequence detector 45 has its input connected to the line 8 and its output connected to the clock recovery device 7 as well as to the switches 37 and 38. The synchronizing sequence has a spectrum comprised of three specific lines to be described later, and the synchronizing sequence detector may be similar in construction to that described in the IBM *Technical Disclosure Bulletin,* Vol. 18, No. 8, January 1976, pp. 2546-2547.

In the data mode of operation the switches 17, 18, 24 and 25 are all set to position I and the switches 37 and 38 are both open. The received signal whose in-phase and quadrature components are respectively available at the outputs of the sampling devices 5 and 6 is demodulated in the demodulator 11 and equalized in the equalizer 14, and its in-phase and quadrature components are then applied to the data detection system 19 through the switches 17 and 18, both of which are set to position I. At each signaling instant, the detection system 19 provides the components of the detected symbol on output lines 20 and 21 and the components of the error signal on output lines 22 and 23. The latter components are applied through the switches 24 and 25, both of which are set to position I, to the equalizer 14, which derives therefrom control signals serving to adjust its coefficients.

During the turn-on period, the receiver is first provided with the synchronizing sequence. This sequence is detected by the synchronizing sequence detector 45 which controls, in particular, the closure of the switches 37 and 38 and the beginning of the synchronization process for the clock recovery device 7 as described in detail in the aforementioned French Patent No. 75-14020. The receiver then receives the training sequence the beginning of which is detected by the training sequence detector 41, which sets via line 44 each of the switches 17, 18, 24 and 25 to position II and initiates the generation of the reference training sequence by the generator 36, which sequentially provides the symbols comprised in the reference sequence at the signaling rate.

At each signaling instant, the in-phase and quadrature components of each of the symbols in the reference sequence are simultaneously provided by the generator 36 on the lines 34 and 35. These components are respectively subtracted from the in-phase and quadrature components of the equalized signal in the subtractors 29 and 32 to provide in-phase and quadrature components of the error signal applied to the equalizer 14. The in-phase and quadrature components of the error signal provided by the subtractors 29 and 32 are applied to the equalizer 14 via the lines 30 and 33 and the switches 24 and 25, both of which are set to position II.

In order that the invention to better appreciated, the manner in which the inventive method may be used to detect the training sequence will now be described.

The turn-on sequence prescribed by CCITT Recommendation V29 comprises a synchronizing sequence, which is a sequence of successive alternations between two symbols designated A and B, followed by an equalizer training sequence, which is a pseudo-random sequence of symbols pertaining to a set of two symbols designated C and D. The training sequence is derived from a pseudo-random binary sequence generated by the polynomial $$1+x^{-6}+x^{-7}$$

Whenever the binary sequence contains a binary "0," the symbol C is transmitted, and whenever it contains a binary "1," the symbol D is transmitted. Also, the training sequence begins with the sequence of symbols CDCDCDC. The synchronizing sequence has a frequency spectrum consisting of three lines respectively located at frequencies $f_c$, $f_1$ and $f_2$ defined as $$f_1 = f_c - \tfrac{1}{2}T, \quad f_2 = f_c + \tfrac{1}{2}T \qquad (3)$$

where $f_c$ is the carrier frequency, and $1/T$ is the signaling rate.

The frequency spectrum of the training sequence comprises a line at the frequency $f_c$ and many additional lines that are symmetrical about $f_c$. The set of symbols A and B and the set of symbols C and D are such that the beginning of the training sequence initiates a 180° change in the phase of the components at $f_c$, $f_1$ and $f_2$ of the synchronizing sequence. Thus, the beginning of the training sequence can be determined by detecting the 180° change in the phase of the component at $f_c$ of the received signal.

This 180° phase change creates a drop in the energy of the component at $f_c$ of the received signal. This can be determined by measuring said energy.

In accordance with the invention, one can detect the 180° change in the phase of the component at $f_c$ of the signal received, and, consequently, the beginning of the training sequence, by detecting the drop in the energy of the DC component of the demodulated received signal.

A detection device in accordance with the present invention will now be described in detail with reference to FIG. 2.

The in-phase and quadrature components of the demodulated signal are respectively applied via the lines 39 and 40 (FIG. 1) to a pair of lowpass filters 50 and 51. The outputs from the filters 50 and 51 are two signals representative, respectively, of the DC components of the in-phase and quadrature components of the demodulated signal. The output from the filter 50 is applied via a line 52 to the two inputs of a multiplier 53, and that from the filter 51 is applied via a line 54 to the two inputs of a multiplier 55. The outputs from the multipliers 53 and 55 are summed in an adder 56 which provides at its output the energy E of the DC component of the demodulated signal. As long as the signal being received consists of the synchronizing sequence, the energy E fluctuates about a constant value $E_o$, and drops well below $E_o$ at the time the phase reversal occurs, i.e., at the beginning of the training sequence.

Several means are available to detect this energy drop. For example, one may detect the time at which the energy reaches its minimum value or at which it has dropped by a predetermined amount.

Figure 2:
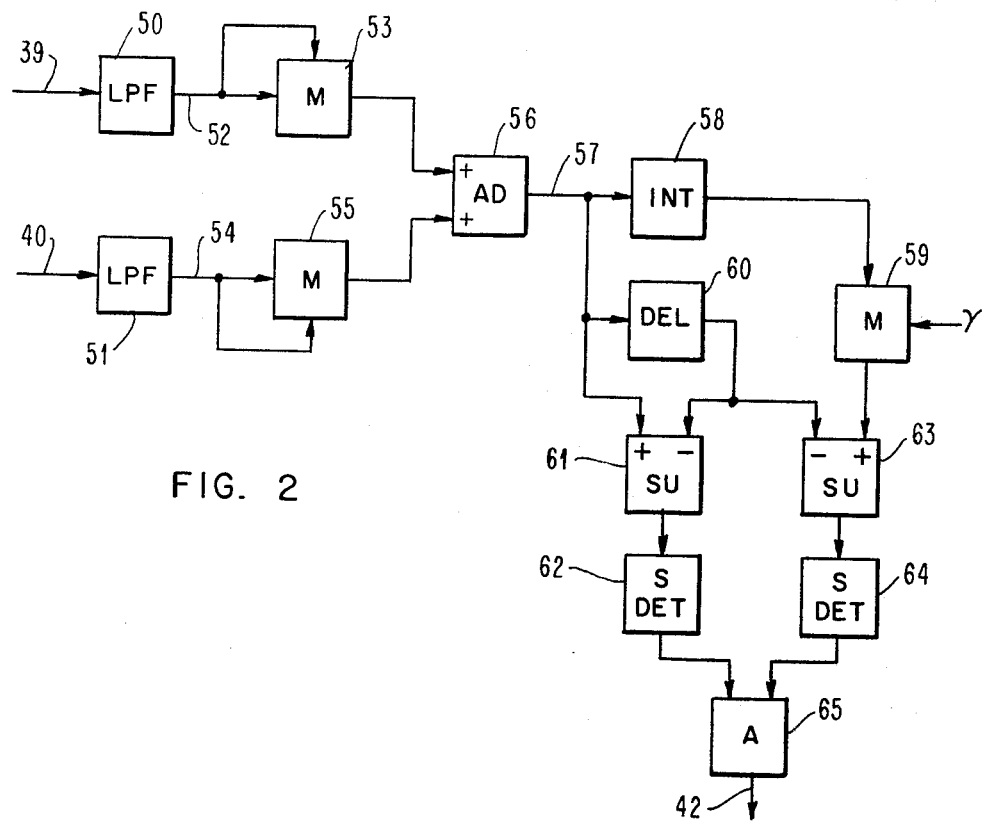
FIG. 2 shows a first embodiment of a sequence detector in accordance with the invention.

In the exemplary embodiment illustrated in FIG. 2, the energy drop is detected when the energy reaches its minimum value. If the energy of the DC component at the signaling instants nT and $(n-1)T$ is designated as $E(nT)$ and $E[(n-1)T]$, it will be deemed to have reached its minimum value when the two conditions below are satisfied:

$$E[(n-1)T] < \gamma E_o \quad (4)$$

and $$E(nT) > E[(n-1)T] \quad (5)$$

where $\gamma$ is a weighting factor equal, for example, to 0.5.

In FIG. 2, the energy obtained at the output of the adder 56 is applied via a line 57 to the input of an integrator 58 which provides the value of the energy $E_o$. The energy $E_o$ is multiplied by the factor $\gamma$ in a multiplier 59. The output from the adder 56 is also applied to the input of a delay element 60 which introduces a T-sec. delay. If the energy at the input of the element 60 is designated as $E(nT)$, the energy obtained at its output will be $E[(n-1)T]$. The input and the output of the element 60 are respectively connected to the (+) and (−) inputs of a subtractor 61 which supplies the quantity $$E(nT) - E[(n-1)T]$$

A sign determining device 62 connected to the output of the subtractor 61 provides a high output if the quantity $$E(nT) - E[(n-1)T]$$

is positive, that is, if the condition defined by the relation (5) is satisfied.

The output of the delay element 60 is also connected to the (−) input of a subtractor 63 which has its (+) input connected to the output of the multiplier 59. A sign determining device 64 connected to the output of the subtractor 63 provides a high output if the quantity $$\gamma E_o - E[(n-1)T]$$

is positive, that is, if the condition defined by the relation (4) is satisfied. The outputs from the devices 62 and 64 are applied to an AND gate 65 which provides a high output on the line 42 (FIG. 1) when the two conditions defined by relations (4) and (5) are satisfied. The occurrence of this high output is indicative of the time at which the training sequence begins.

Figure 3:
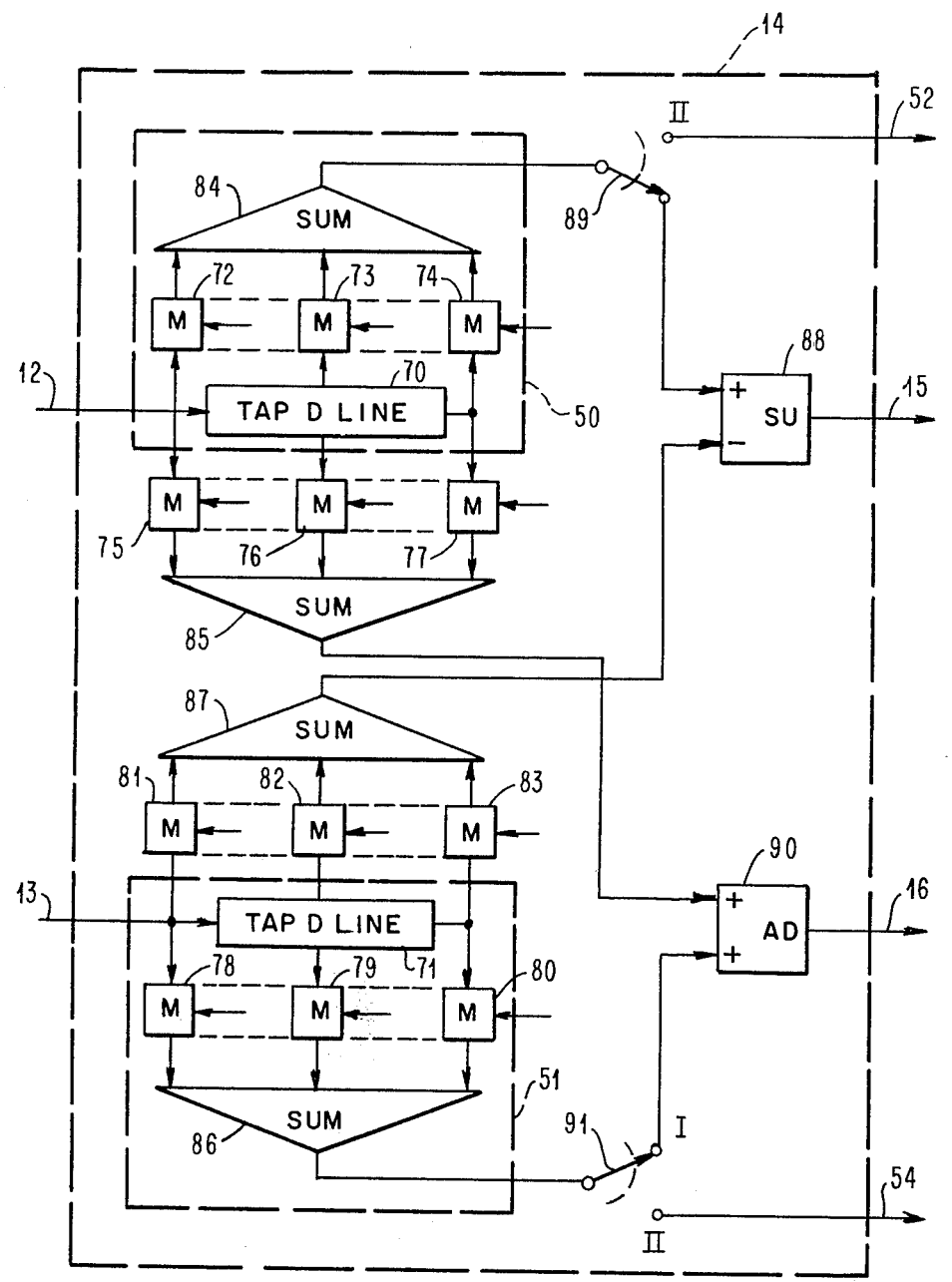
FIG. 3 shows a preferred embodiment of the lowpass filters used in the sequence detector of the invention.

The lowpass filters 50 and 51 can advantageously be realized by making use of the complex equalizer 14, as shown in FIG. 3.

The complex equalizer 14 has been shown in FIG. 3 along with the means to be added thereto to enable the equalizer to be used as such in the data mode of operation and to perform the function of the lowpass filters 50 and 51 during the turn-on period.

The equalizer 14 includes two M-tap delay lines 70 and 71 which have their inputs respectively connected to the lines 12 and 13 and in which the in-phase and quadrature components of the demodulated signal are respectively stored. The delay between two adjacent taps is equal to the signaling period T. The taps of the delay line 70 are respectively connected to a first input of M multipliers 72, . . . , 73, . . . , 74, and to a first input of M multipliers 75, . . . , 76, . . . , 77. The second inputs of the multipliers 72, . . . , 73, . . . , 74 receive the coefficients $c_1, \ldots, c_m, \ldots, c_M$, respectively, while the second inputs of the multipliers 75, . . . , 76, . . . , 77 receive the coefficients $d_1, \ldots, d_m, \ldots, d_M$, respectively. The taps of the delay line 71 are respectively connected to a first input of M multipliers 78, . . . , 79, . . . , 80, and to a first input of M multipliers, 81, . . . , 82, . . . , 83. The second inputs of the multipliers 78, . . . , 79, . . . , 80 receive the coefficients $c_1, \ldots, c_m, \ldots, c_M$, respectively, while the second inputs of the multipliers 81, . . . , 82, . . . , 83, receive the coefficients $d_1, \ldots, d_m, \ldots, d_M$, respectively. The outputs from the multipliers 72, . . . , 74 are summed in a summing device 84. The outputs from the multipliers 75, . . . , 77 are summed in a summing device 85. The outputs from the multipliers 78, . . . , 80 are summed in a summing device 86, and those from the multipliers 81, . . . , 83, in a summing device 87. The output from the device 87 is applied to the (−) input of a subtractor 88 which has its output connected to the line 15 (FIG. 1). The output of the summing device 84 is connected to the input of a two-position switch 89. Positions I and II of the switch 89 are respectively connected to the (+) input of the subtractor 88 and to the line 52 (FIG. 2). The output of the summing device 85 is connected to a (+) input of an adder 90 which has its output connected to the line 16 (FIG. 1). The output of the summing device 86 is connected to the input of a two-position switch 91. Positions I and II of the switch 91 are respectively connected to the other (+) input of the adder 90 and to the line 54 (FIG. 2). The coefficients of the equalizer are adjusted by a coefficient adjusting device not shown. For more details, reference should be made to the above-mentioned French patent No. 73-26404.

In the data mode of operation, the switches 89 and 91 are both set to position I. The in-phase and quadrature components, $y_{i,n}$ and $y_{q,n}$ of the demodulated received signal are present on the lines 12 and 13. It can be shown that the in-phase and quadrature components, $z_{i,n}$ and $z_{q,n}$ of the equalized signal will then be obtained on the lines 15 and 16 in accordance with the well-known relations $$z_{i,n} = \sum_{m=1}^{M} y_{i,n-m} c_m - \sum_{m=1}^{M} y_{q,n-m} d_m \qquad (6)$$

$$z_{q,n} = \sum_{m=1}^{M} y_{i,n-m} d_m + \sum_{m=1}^{m} y_{q,n-m} c_m \qquad (7)$$

As shown in FIG. 3, the complex equalizer consists of four transversal filters: a first filter the input of which is the line 12 and the output of which is the output of the summing device 84, a second filter the input of which is also the line 12 and the output of which is the output of the summing device 85, a third filter the input of which is the line 13 and the output of which is the output of the summing device 86, and a fourth filter the input of which is the line 13 and the output of which is the output of the summing device 87. During the turn-on period, said first and third filters perform the function of the lowpass filters 50 and 51 provided in the detector of the present invention.

During the turn-on period, the detector 45 (FIG. 1), when it detects the beginning of the synchronizing sequence, sets the switches 89 and 91 to position II, resets the coefficients $d_1, \ldots, d_m, \ldots, d_M$, and sets the coefficients $c_1, \ldots, c_m, \ldots, c_M$ to values such that said first and third filters can act as lowpass filters.

By way of example, the following values may be chosen $$c_m = \frac{\sin^2 (m - M/2)\pi/8}{[(m - M/2)\pi/8]^2}$$

$m = 1, \ldots, M$
($M$ assumed even)

The outputs from said first and third filters (which are, respectively, the filters 50 and 51) are then available on the lines 52 and 54 and are processed as has been explained in connection with FIG. 2. When it detects the beginning of the training sequence, the training sequence detector 41 sets the switches 89 and 91 to position I, and resets the coefficients $c_1, \ldots, c_m, \ldots, c_M$. The device illustrated in FIG. 3 is then used as an equalizer during the training period.

Figure 4:
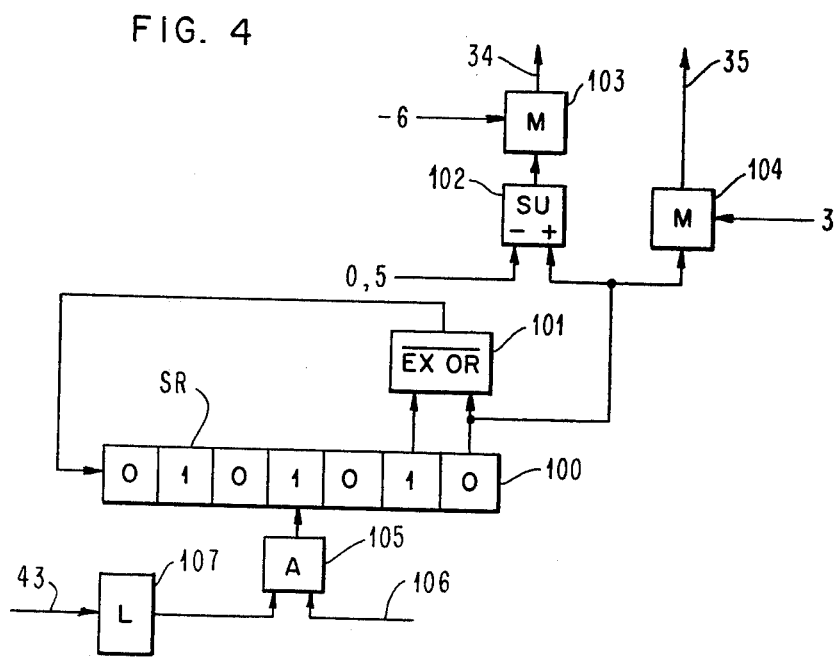
FIG. 4 shows an exemplary embodiment of a generator of reference sequences.

Referring now to FIG. 4, an exemplary embodiment of the reference sequence generator 36 of FIG. 1 is shown. The generator shown in FIG. 4 is in accordance with CCITT Recommendation V29 and includes a seven-stage shift register 100. The outputs of the sixth and seventh stages are connected to the inputs of an inverted Exclusive OR circuit 101 which has its output connected to the input of the first stage of the shift register 100, and also to the (+) input of a subtractor 102 the (−) input of which receives the binary coded value 0.5. The output of the subtractor 102 is connected to an input of a multiplier 103 the other input of which receives the binary coded value −6. The output of the multiplier 103 is connected to the line 34 (FIG. 1). The output of the seventh stage is also connected to an input of a multiplier 104 the other input of which receives the binary coded value 3. The output of the multiplier 104 is connected to the line 35 (FIG. 1). The generator of FIG. 4 also includes an AND gate 105 an input of which receives via a line 106 pulses generated at the signaling rate 1/T by the clock recovery device 7. The other input of the AND gate 105 is connected to the output of a latch 107 the input of which is connected to the line 43 (FIG. 1). The output from the AND gate 105 controls the operation of the shift register 100.

In operation, the bit configuration 0101010 shown in the figure is first loaded into the shift register 100 in accordance with the above-mentioned CCITT Recommendation. This can be done, for example, under the control of the synchronizing sequence detector 45.

When the beginning of the training sequence is detected, an up level appears on the line 43, as has been described. This level sets the latch 107, the output of which enables the AND gate 105, so that the timing pulses present on the line 106 are applied as shift pulses to the register 100. The generator of FIG. 4 must generate a symbol C whenever a "0" bit appears at the output of the seventh stage of the shift register 100, and a symbol D whenever a "1" bit is obtained at the output of the seventh stage. In accordance with CCITT Recommendation V29, at the transmission rate of 9600 bits per second the in-phase and quadrature components of the symbols C and D have the following values:

$c(+3,0) D(-3, +3)$

These components are generated by means of the subtractor 102 and the multipliers 103 and 104. If a "0" bit appears at the output of the seventh stage of the shift register 100, the value 0.5 is subtracted therefrom in the subtractor 102, which consequently supplies the value −0.5. The latter value is multiplied by −6 in the multiplier 103, which thus supplies the value +3 representing the in-phase component of the symbol C. It will be seen that if a "1" bit appears at the output of the seventh stage, the values −3 and +3, representing the in-phase and quadrature components of the symbol D, will be obtained at the output of the multipliers 103 and 104, respectively.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. In a receiver used in a data transmission system employing single sideband-quadrature carrier modulation and wherein the transmitter generates at the signaling rate 1/T a first sequence of symbols that consists of successive alternations between two symbols making up a first set of symbols, followed by a second, pseudo-random sequence of symbols belonging to a second set of two symbols, said first and second sets being such that the beginning of said second sequence initiates a reversal of the phase of the components of the frequency spectrum of said first sequence, a method of detecting the time at which said second sequence begins, characterized in that it includes the steps of:
  (a) demodulating the received signal,
  (b) determining the DC component of the demodulated signal,
  (c) measuring the energy of said DC component,
  (d) measuring the average value of said energy, and
  (e) detecting the time at which said energy drops below its average value, said time being indicative of the time at which said second sequence begins.

2. In a receiver used in a data transmission system employing single sideband-quadrature carrier modulation and wherein the transmitter generates at the signaling rate 1/T a first sequence of symbols that consists of successive alternations between two symbols making up a first set of symbols, followed by a second, pseudo-random sequence of symbols belonging to a second set of two symbols, said first and second sets being such that the beginning of said second sequence initiates a reversal of the phase of the components of the frequency spectrum of said first sequence, a method of detecting the time at which said second sequence begins, characterized in that it includes the steps of:

(a) demodulating the received signal,
(b) filtering said demodulated signal, using lowpass filter means,
(c) measuring the energy of the signal provided by said filtering step,
(d) measuring the average value of said energy, and
(e) detecting the time at which said energy drops below its average value, said time being indicative of the time at which said second sequence begins.

3. A method according to claim 1 or 2, characterized in that the time at which said energy drops is the time at which said energy reaches its minimum value.

4. In a receiver used in a data transmission system employing single sideband-quadrature carrier modulation and wherein the transmitter generates at the signaling rate 1/T a first sequence of symbols that consists of successive alternations between two symbols making up a first set of symbols, followed by a second, pseudo-random sequence of symbols belonging to a second set of two symbols, said first and second sets being such that the beginning of said second sequence initiates a reversal of the phase of the components of the frequency spectrum of said first sequence, a device for detecting the time at which said second sequence begins, characterized in that it includes:

demodulation means responsive to the received signal for demodulating the received signal,
lowpass filter means responsive to the demodulated received signals for filtering the demodulated signal,
first means responsive to the filtered demodulated received signal for measuring the energy of the said signal,
second means responsive to the said measured energy signal for measuring the average value of said energy signal, and
detection means responsive to the first and second means for detecting the time at which said energy drops below its average value, said time being indicative of the time at which said second sequence begins.

5. In a receiver used in a data transmission system employing single sideband-quadrature carrier modulation and wherein the transmitter generates at the signaling rate 1/T a first sequence of symbols that consists of successive alternations between two symbols making up a first set of symbols, followed by a second, pseudo-random sequence of symbols belonging to a second set of two symbols, said first and second sets being such that the beginning of said second sequence initiates a reversal of the phase of the components of the frequency spectrum of said first sequence, a device for detecting the time at which said second sequence begins, characterized in that it includes:

transformation means responsive to the received signal for providing the in-phase and quadrature components of the received signal,
a source providing an in-phase carrier and a quadrature carrier,
demodulation means responsive to said transformation means and said source for demodulating, by means of said in-phase and quadrature carriers, the signal defined by the in-phase and quadrature components provided by said transformation means, and for supplying the in-phase and quadrature components of the demodulated signal,
first lowpass filter means connected to said demodulation means for filtering said in-phase components of the demodulated signal,
second lowpass filter means connected to said demodulation means for filtering said quadrature component of the demodulated signal,
measuring means responsive to the first and second lowpass filter means for measuring the energy of the signal whose in-phase and quadrature components consist of the outputs from said first and second filter means, respectively and
means for measuring the average value of said energy, and
detection means for comparing the measured energy and the measured average value of the energy for detecting the instant at which the said energy drops below its average value, said time being indicative of the time at which said second sequence begins.

6. A device according to claim 5, characterized in that said measuring means includes:
first multiplication means for multiplying the output from said first filtering means by itself,
second multiplication means for multiplying the output from said second filter means by itself, and
means for summing the outputs from said first and second multiplication means.

7. In a receiver used in a data transmission system employing single sideband-quadrature carrier modulation and wherein the transmitter generates at the signaling rate 1/T a first sequence of symbols that consists of successive alternations between two symbols making up a first set of symbols, followed by a second, pseudo-random sequence of symbols belonging to a second set of two symbols, said first and second set being such that the beginning of said second sequence initiates a reversal of the phase of the components of the frequency spectrum of said first sequence, a device for detecting the time at which said second sequence begins, characterized in that it includes:

demodulation means responsive to the received signal for demodulating the received signal,
lowpass filter means responsive to the demodulated received signals for filtering the demodulated signal,
first means responsive to the filtered demodulated received signal for measuring the energy of the said signal,
second means responsive to the said measured energy signal for measuring the average value of said energy signal, and
detection means responsive to the first and second means for detecting the time at which said energy reaches its minimum value, said time being indicative of the time at which said second sequence begins.

* * * * *